UNITED STATES PATENT OFFICE.

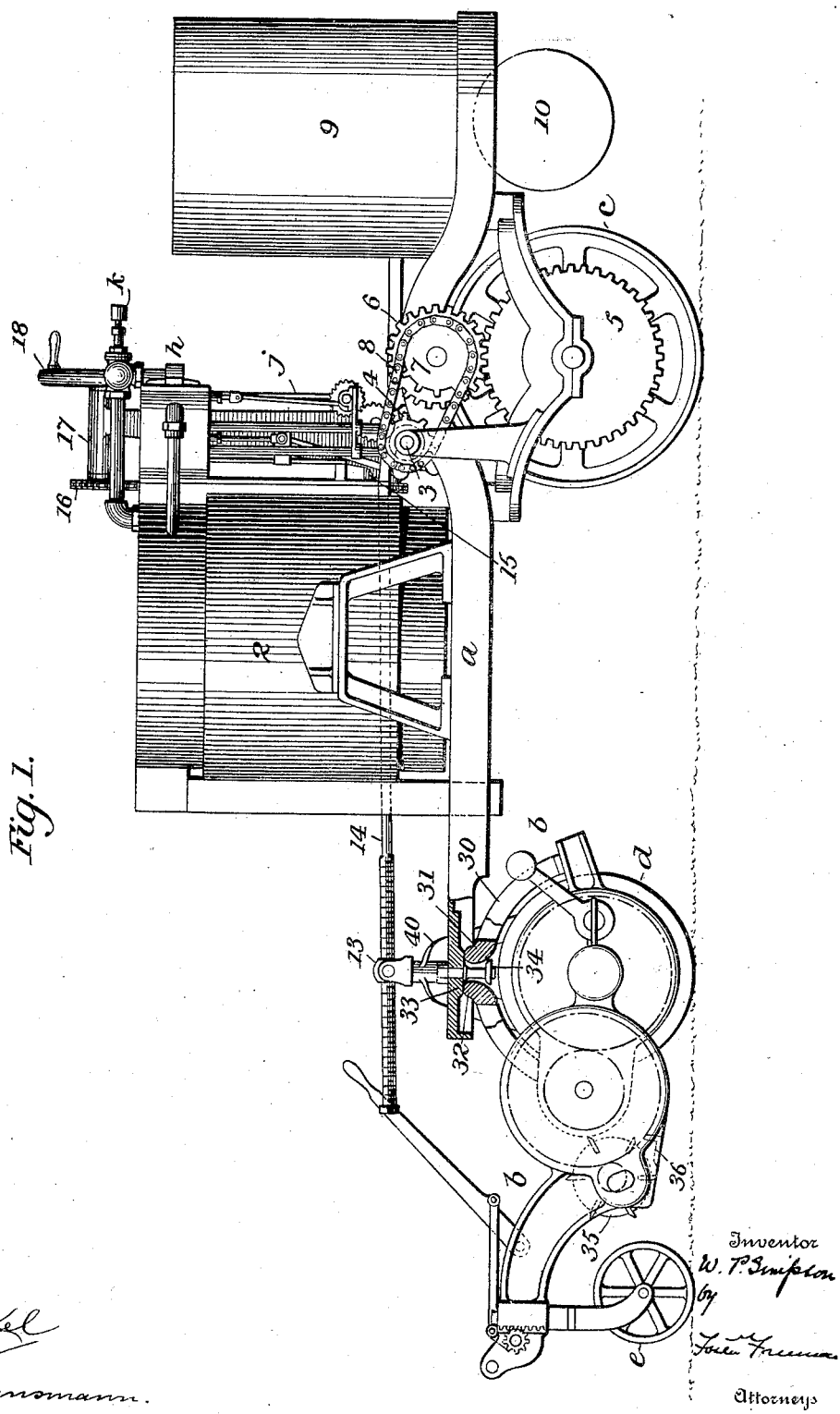

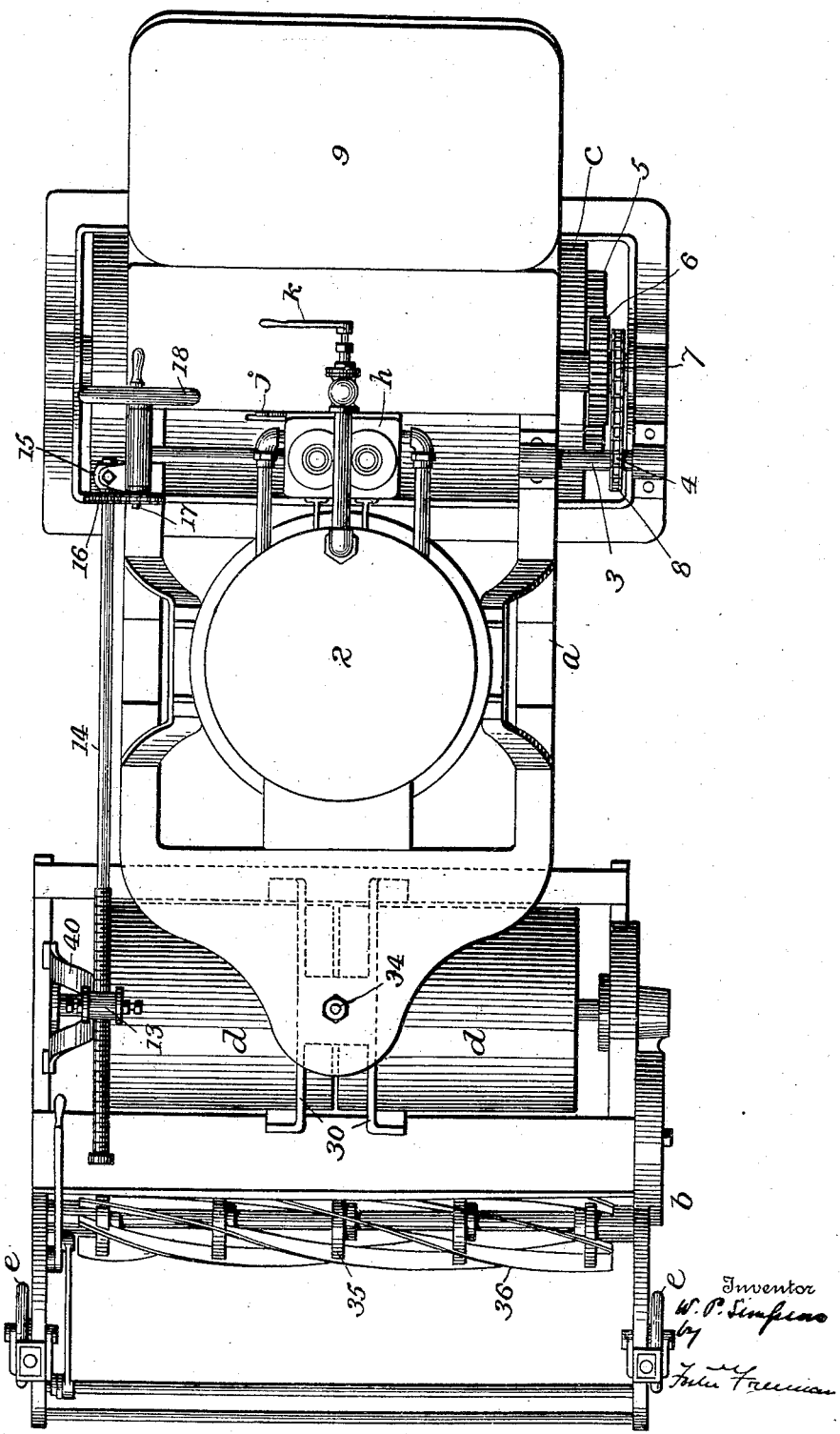

WILLIAM PERCY SIMPSON, OF OVERBROOK, PENNSYLVANIA.

MOTOR-PROPELLED LAWN CUTTER AND ROLLER.

SPECIFICATION forming part of Letters Patent No. 706,864, dated August 12, 1902.

Application filed March 14, 1901. Serial No. 51,129. (No model.)

*To all whom it may concern:*

Be it known that I, WILLIAM PERCY SIMPSON, a citizen of the United States, residing at Overbrook, in the county of Montgomery and State of Pennsylvania, have invented certain new and useful Improvements in Motor-Propelled Lawn Cutters and Rollers, of which the following is a specification.

My invention relates to lawn-mowers; and my invention comprises a lawn-mower provided with means whereby it may be mechanically propelled under the control of an operator while securing the proper operation and adjustments of the driving and cutting devices, together with the effective operations of a lawn-roller under the weight of the propelling apparatus and of the attendant, as fully set forth hereinafter and as illustrated in the accompanying drawings, in which—

Figure 1 is a side elevation, in part section, of a lawn mower and roller embodying my invention; Fig. 2, a plan view.

The apparatus is provided with a main frame $a$, having bearings for the lawn roller or rollers $c$, and the secondary frame $b$, having bearings for supporting rollers or wheels or drums $d$ $e$. As shown, the frame $b$ is provided with drums $d$ at the rear end and with caster-wheels $e$ at the forward end, and between the two frames there is such a connection as will permit the supporting rollers or wheels of each frame to accommodate themselves to the inequalities of the ground without straining the said connections, and preferably permitting the frame $b$, with its supporting-rolls, to be turned to any desired direction as a means of guiding or accommodating itself to the movement of the main frame. Various arrangements of connecting means may be employed for permitting the said frames to rock transversely, or transversely and longitudinally, and also, if desired, for changing the direction of the second frame; but, as shown, the connection is preferably in the form of a universal joint. This is secured by inserting between arched bars 30 30 of the frame $b$ a block 31 with a central opening and surrounding annular rib 32, bearing on a projection 33 at the under side of the main frame, with a bolt 34 extending downward through the opening in the block, the contacting faces being rounded, so as to permit the two frames to assume any desired angle to each other in any direction, and also, if desired, permitting the frame $b$ to swing about the connecting-bolt in order to guide the main frame in its movements.

The secondary frame $b$ constitutes the cutter-frame—that is, it supports the devices for cutting the grass—which may be of any desired character, but, as shown, consists of a rotating cutter-head 35 and cutter blade or knife 36, the cutter-head being driven, as usual, by gears (not shown) from the wheels or drums $d$. Suitable means may be employed for lifting the forward end of the frame $b$, those indicated in the drawings being of ordinary character and not requiring description.

The apparatus is mechanically propelled over the ground by the action of a suitable motor carried by the main frame, which motor may be of any suitable character—as, for instance, an electric motor, gas-engine, or steam-engine, the latter being shown and consisting of an engine $h$ of ordinary construction, receiving steam from the boiler 2 and provided with a driving-shaft 3 and with reversing-lever $j$, whereby the direction of rotation may be reversed, the engine being put in operation or arrested and its speed regulated by means of the hand-lever $k$, connected with an ordinary throttle.

It will be evident that an apparatus of this kind can only be propelled over the ground at a rate of speed at which it is possible to cut or mow the grass. As a direct gearing with the engine would result in a speed of much greater rapidity than would be practicable in connection with the operation of the cutters, I drive the roller or rollers $c$ through the medium of reducing-gears of suitable character. Thus the roller or roller-shaft carries a gear 5, engaging a pinion 6, connected with a sprocket 7, from which a chain 8 passes to a smaller sprocket 4 upon the shaft 3. It will be evident that any other suitable character of reducing-gear may be employed.

As shown, the boiler is arranged in front of the engine, which is supported by the boiler, and the water-tank 9 is at the rear, the gasolene-tank 10 when a vapor-burner is employed being arranged beneath the same at any suitable point and the gasolene being conducted to the burner by air-pressure or otherwise.

When the secondary frame b is pivoted so as to serve as a means of guiding the apparatus, means are provided for swinging the said frame about its pivot. Any suitable means may be employed; but preferably a bracket 40 on the frame b carries a nut 13, with supports permitting it to swing in any desired direction, and through this nut extends the threaded end of a shaft 14, the inner end of which turns without sliding in a block 15, supported so as to swing to any desired direction, and the shaft 14 is turned from a shaft 17, provided with a hand-wheel 18 by means of a chain 16, passing around sprockets on the shafts 14 and 17. As thus constructed the operator by turning the hand-wheel 18 and rotating the shaft 14 in one direction or the other can swing the frame b as desired.

It will be seen that the apparatus as above constructed is self-propelling and that as it is propelled the cutters operate to cut or mow the grass, while the roller or rollers serve to roll the lawn with great effect in consequence of the weight of the attendant and engine, especially in the case of a steam-engine, where there is the weight of the boiler and water-tank and contents. It will further be seen that the desired rapid movement of the engine can be maintained while the apparatus is driven at the proper speed for the cutting operations and that the operations of the engine and the direction of movement are all controlled by the operator from one point of the apparatus. It will also be seen that the two frames will accommodate themselves to any inequalities of the ground while maintaining their necessary relations, but without straining the connection between them, and that when said connection is a pivotal connection the adjustment of the secondary frame is made the means of guiding the apparatus, so that separate guiding and supporting rolls or wheels and the necessity of lifting the cutting-frame away from the ground are avoided. It will further be seen that the secondary frame is self-supporting—that is, it is provided with rollers which support its entire weight, so that it does not depend upon the main frame or any part thereof as the means of maintaining its position in respect to the ground.

Without limiting myself to the precise construction of parts shown and described, I claim—

1. The combination with a frame and combined traction and rolling rollers, of a second frame provided with supporting devices engaging the ground, and with cutting mechanism, said second frame pivoted to and supporting the forward end of the main frame, substantially as set forth.

2. The combination with a frame and combined traction and rolling rollers, of a second frame provided with supporting devices engaging the ground, and with cutting mechanism, said second frame pivoted by a universal joint to and supporting the forward end of the main frame, substantially as set forth.

3. The combination with a frame and combined traction and rolling rollers, of a second frame provided with supporting devices engaging the ground and with cutting mechanism, said second frame pivoted to and supporting the forward end of the main frame, and a motor operatively connected with said traction rollers, substantially as set forth.

4. The combination with a frame and combined traction and rolling rollers, of a second frame provided with rollers supporting its entire weight and with cutting mechanism driven from said rollers, and with connections between the frames permitting them to rock longitudinally and transversely with respect to each other, substantially as set forth.

5. The combination with a frame and combined traction and rolling rollers, of a second frame provided with rollers supporting its entire weight and with cutting mechanism driven from said rollers, and with connections between the frames permitting them to rock longitudinally and transversely with respect to each other, and a motor operatively connected with said traction rollers, substantially as set forth.

6. The combination in a lawn roller and mower, of a cutter-frame having supporting-wheels, a main frame supported partly by the cutter-frame and partly by rolling rollers, said frames connected to permit each to rock independently of the other, and a motor operatively connected to drive the apparatus, substantially as set forth.

7. The combination in a lawn roller and mower, of a cutter-frame having supporting-wheels connected to operate the cutter, a main frame supported partly by the cutter-frame and partly by rolling rollers, said frames connected to permit each to rock independently of the other, and a motor operatively connected to drive the apparatus, substantially as set forth.

8. The combination in a lawn roller and mower, of a cutter-frame having supporting-wheels, a main frame supported partly by the cutter-frame and partly by rolling rollers, said frames connected to permit each to rock independently of the other, a motor operatively connected to drive the apparatus, and a hand device and connections whereby to turn the cutter-frame to guide the apparatus, substantially as set forth.

9. The combination with a frame, of a combined traction and lawn-rolling roller connected therewith, a second frame provided with supporting devices engaging the ground and supporting the entire weight of said frame, cutting mechanism carried by the second frame, means for operating said mechanism, connections between the frames permitting them to rock transversely in respect to each other, a motor carried by the main frame, a gear on the motor-shaft, a gear connected with the roller, and intermediate gear supported by the main frame, substantially as set forth.

10. The combination with a frame, combined traction and lawn-rolling rollers connected therewith, of a second frame, arranged in front of said traction and lawn-rolling rollers and provided with supporting devices engaging the ground and supporting the entire weight of the frame, cutting mechanism carried by said second frame, a motor operatively connected with said traction-rollers and connections between said frames permitting them to rock transversely with respect to each other to accommodate them to inequalities of the ground, substantially as described.

11. The combination with a frame and combined traction and lawn-rolling rollers connected therewith, of a second frame, arranged in front of said traction and lawn-rolling rollers and provided with rollers supporting the entire weight of the frame, cutting mechanism carried by said second frame, a motor operatively connected with said traction-rollers and connections between said frames permitting them to rock longitudinally and transversely with respect to each other, substantially as described.

In testimony whereof I have signed my name to this specification in the presence of two subscribing witnesses.

WILLIAM PERCY SIMPSON.

Witnesses:
  W. P. ANTHONY,
  S. E. PATTERSON.